US008800374B2

(12) United States Patent  
Sonyey et al.

(10) Patent No.: US 8,800,374 B2  
(45) Date of Patent: Aug. 12, 2014

(54) PORTABLE VIBRATION MONITORING DEVICE

(75) Inventors: Gabor Sonyey, San Diego, CA (US); Torsten Bark, San Diego, CA (US)

(73) Assignee: Aktiebolaget SKF, Gothenburg (SE)

( * ) Notice: Subject to any disclaimer, the term of this patent is extended or adjusted under 35 U.S.C. 154(b) by 544 days.

(21) Appl. No.: 13/124,095

(22) PCT Filed: Oct. 14, 2009

(86) PCT No.: PCT/US2009/005619  
§ 371 (c)(1),  
(2), (4) Date: Aug. 5, 2011

(87) PCT Pub. No.: WO2010/044860  
PCT Pub. Date: Apr. 22, 2010

(65) Prior Publication Data  
US 2011/0279952 A1    Nov. 17, 2011

(51) Int. Cl.  
*H05K 5/00* (2006.01)  
*G01H 17/00* (2006.01)

(52) U.S. Cl.  
CPC .................................. *G01H 17/00* (2013.01)  
USPC ........................................ 73/649; 361/679.01

(58) Field of Classification Search  
CPC ...... G01H 17/00; A61B 8/0858; G01B 17/00; Y10S 367/91  
USPC .............. 73/649, 570, 584, 587; 361/679.01; 374/117  
See application file for complete search history.

(56) References Cited

U.S. PATENT DOCUMENTS

| 3,415,108 | A | * | 12/1968 | Hubner | 73/31.05 |
| 3,877,291 | A | * | 4/1975 | Hoppesch et al. | 73/23.3 |
| 4,360,856 | A | * | 11/1982 | Witthaus | 361/170 |
| 4,520,674 | A | * | 6/1985 | Canada et al. | 73/660 |
| 4,722,224 | A | * | 2/1988 | Scheller et al. | 73/599 |
| 4,823,600 | A | * | 4/1989 | Biegel et al. | 73/592 |
| 4,879,546 | A | * | 11/1989 | Dunham et al. | 340/632 |
| 4,981,044 | A | * | 1/1991 | Adams et al. | 73/623 |
| 5,025,653 | A | * | 6/1991 | Schuldt | 73/23.2 |
| 5,053,747 | A | * | 10/1991 | Slate et al. | 340/507 |
| 5,069,879 | A | * | 12/1991 | Leichnitz et al. | 422/86 |
| 5,218,347 | A | * | 6/1993 | Deppe | 340/634 |
| 5,309,777 | A | * | 5/1994 | Schmitt et al. | 73/866.3 |

(Continued)

*Primary Examiner* — Peter MacChiarolo  
*Assistant Examiner* — Samir M Shah  
(74) *Attorney, Agent, or Firm* — Mark A. Ussai; SKF USA Inc. Patent Department

(57) ABSTRACT

A portable monitoring device includes a hand-held housing, a processing circuit disposed within the housing, and a primary sensor extending outwardly from the housing, coupled with the processing circuit, and configured to transmit input to the processing circuit. A rechargeable battery is disposed within the housing and is configured to provide electric power to at least the processing circuit. A connector is coupled with the processing circuit and configured to operatively couple the battery with a battery charger and to alternatively couple the processing circuit with at least one of a secondary sensor and a calibration device. Preferably, a temperature sensor is disposed proximal to the primary sensor and configured to transmit temperature input to the processing circuit, and a switch disposed within the housing is electrically connected with the processing circuit, the connector and the primary sensor and couples the connector with the battery charger or the processing circuit.

21 Claims, 7 Drawing Sheets

(56) References Cited

U.S. PATENT DOCUMENTS

| | | | |
|---|---|---|---|
| 5,633,811 A * | 5/1997 | Canada et al. .................. 702/56 |
| 5,719,325 A * | 2/1998 | Kiesele et al. ................ 73/31.06 |
| 5,834,626 A * | 11/1998 | De Castro et al. ............. 73/23.3 |
| 5,854,994 A * | 12/1998 | Canada et al. .................. 702/56 |
| 5,959,191 A * | 9/1999 | Lewis et al. .................. 73/31.05 |
| 6,006,164 A | 12/1999 | McCarty et al. |
| 6,220,098 B1 | 4/2001 | Johnson et al. |
| 6,430,988 B1 * | 8/2002 | Watanabe .................. 73/40.5 A |
| 6,883,364 B2 * | 4/2005 | Sunshine et al. ............. 73/23.34 |
| 7,022,993 B1 * | 4/2006 | Williams et al. ............. 250/343 |
| 7,362,229 B2 * | 4/2008 | Brinton et al. ............. 340/572.1 |
| 7,498,946 B2 * | 3/2009 | Forcier et al. ............. 340/572.2 |
| 7,698,946 B2 * | 4/2010 | Clarke et al. .................... 73/601 |
| 7,908,118 B2 * | 3/2011 | Trowbridge et al. .......... 702/182 |
| 7,908,924 B2 * | 3/2011 | Schnitta et al. ................. 73/644 |
| 8,033,172 B2 * | 10/2011 | Langlois et al. ................ 73/626 |
| 8,168,121 B2 * | 5/2012 | Elkins ............................. 422/83 |
| 8,175,820 B2 * | 5/2012 | Hatanaka et al. ............. 702/39 |
| 8,466,796 B1 * | 6/2013 | Mejia et al. .................. 340/576 |
| 2002/0166394 A1 * | 11/2002 | Mathur et al. ............. 73/864.24 |
| 2007/0103324 A1 * | 5/2007 | Kosuge et al. ................. 340/618 |
| 2008/0179522 A1 * | 7/2008 | Vallon et al. ................ 250/336.1 |
| 2012/0078539 A1 * | 3/2012 | Vernon-Harcourt et al. ... 702/50 |

\* cited by examiner

US 8,800,374 B2

PORTABLE VIBRATION MONITORING DEVICE

The present invention relates to machine monitoring devices, and more particularly to portable vibration monitoring devices.

BACKGROUND OF THE INVENTION

Portable monitoring devices, particularly hand-held monitoring devices, are known and include devices used to sense vibration or other operational parameters (e.g., temperature) of machines. One such device is the VIBRATION PEN™ commercially available from SKF Condition Monitoring, Inc. of San Diego, Calif.

SUMMARY OF THE INVENTION

In one aspect, the present invention is a portable monitoring device comprising a housing, a processing circuit disposed within the housing, and a primary sensor extending outwardly from the housing, coupled with the processing circuit, and configured to transmit input to the processing circuit. A rechargeable battery is disposed within the housing and is configured to provide electric power to at least the processing circuit. Further, a connector is coupled with the processing circuit, the connector being configured to operatively couple the battery with a battery charger and to alternatively couple the processing circuit with at least one of a secondary sensor and a calibration device.

In another aspect, the present invention is a portable monitoring device comprising a housing, a processing circuit disposed within the housing, and a primary sensor extending outwardly from the housing, coupled with the processing circuit, and configured to transmit input to the processing circuit. A temperature sensor is disposed proximal to the primary sensor and is configured to transmit temperature input to the processing circuit. A connector is coupled with the processing circuit and is configured to operatively couple the processing circuit with a secondary sensor. Further, a switch is disposed within the housing, electrically connected with each of the processing circuit, the connector and the primary sensor. The switch is adjustable between a first position at which the processing circuit receives input from the primary sensor and a second position at which the processing circuit receives input from the connector, the processing circuit being configured to deactivate the temperature sensor and adjust the switch to the second position when the secondary sensor is coupled with the connector.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
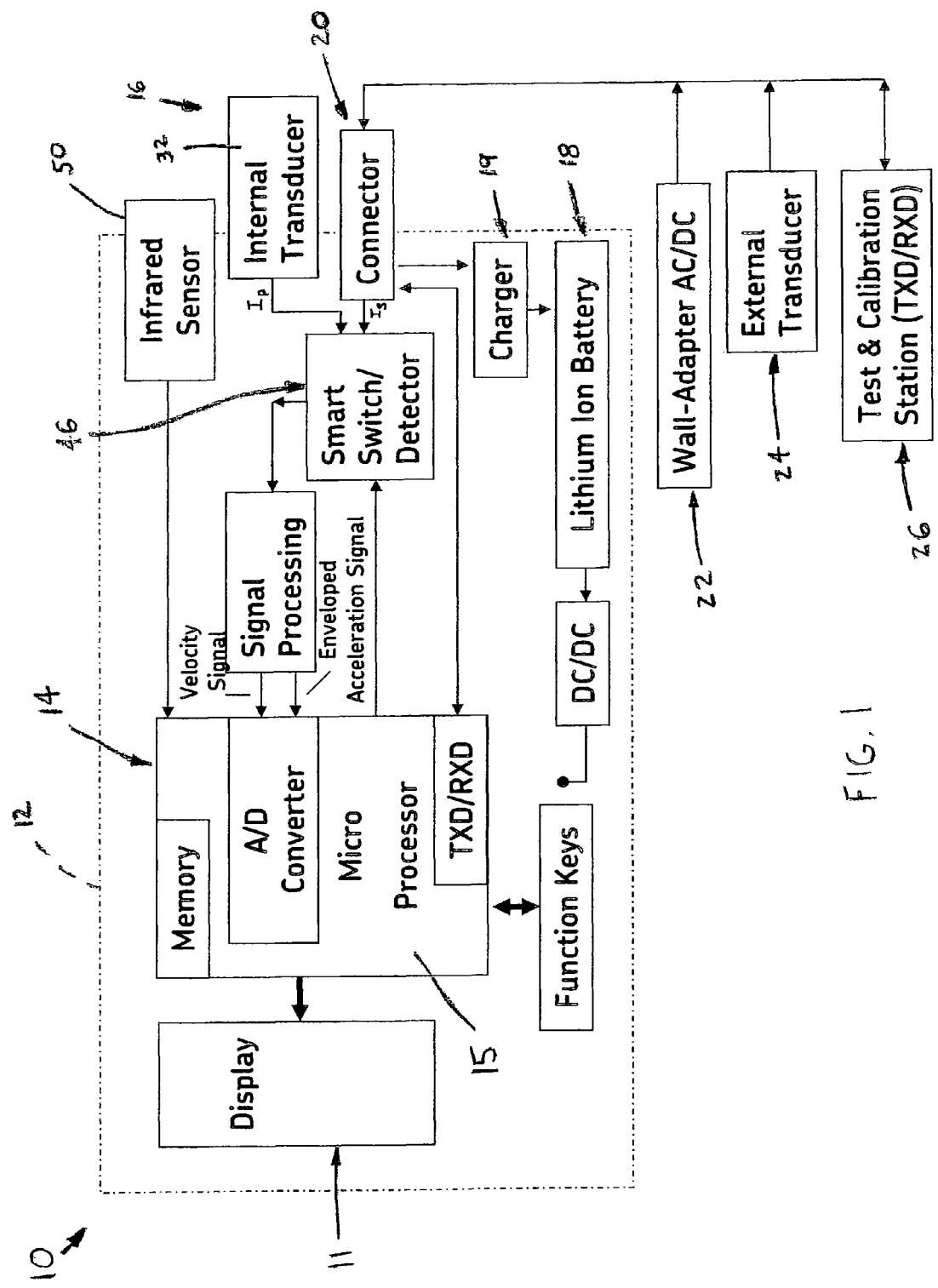
FIG. 1 is a schematic view of a monitoring device in accordance with the present invention.
Figure 2:
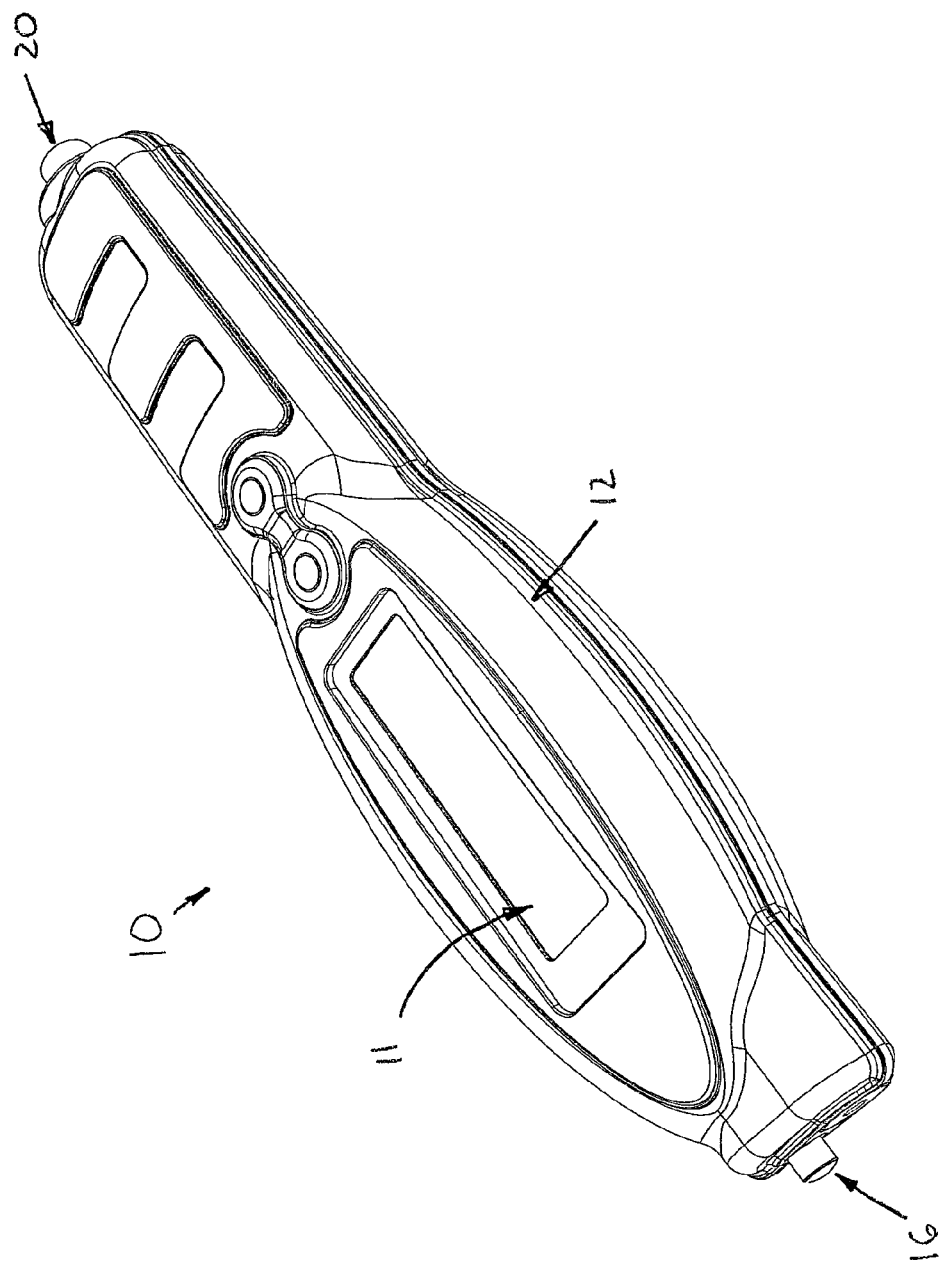
FIG. 2 is a top perspective view of the monitoring device.
Figure 3:
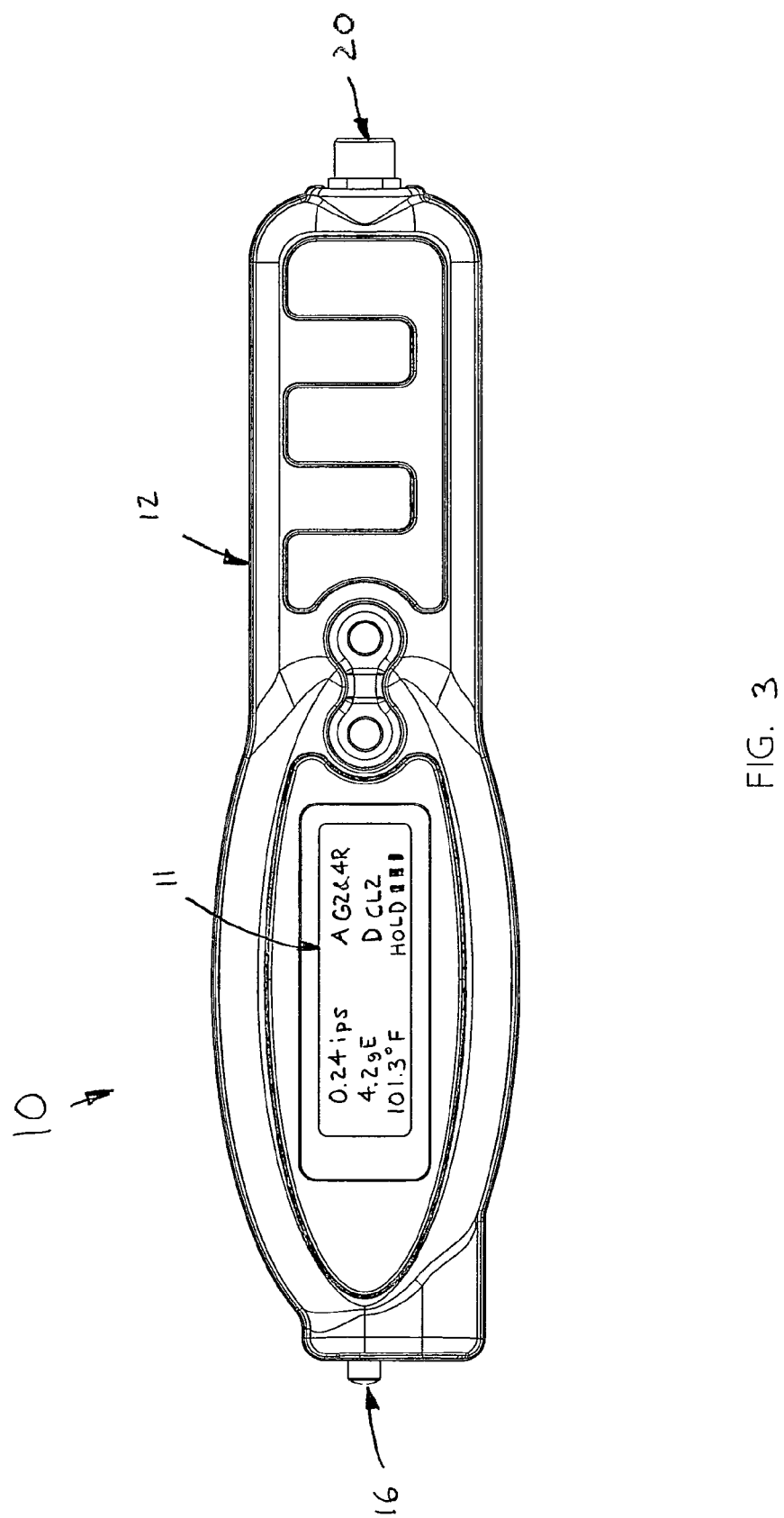
FIG. 3 is a top plan view of the monitoring device.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-9 a portable monitoring device 10, preferably for measuring at least vibration of a machine M (not shown). The monitoring device basically comprises a housing 12, a processing circuit 14 disposed within the housing 12, a primary or "internal" sensor 16 disposed at least partially within the housing 12, a rechargeable battery 18 disposed within the housing 12, and a connector 20. The housing 12 is preferably sized and shaped to be manually grasped by a user (i.e., "hand held"), but may alternatively be sized or configured to be rested upon a surface, such as a floor or machine surface, during use. The primary sensor 16 is coupled with the processing circuit 14 and is configured to transmit input $I_P$ to the processing circuit 14, preferably corresponding to vibration as discussed below. Further, the rechargeable battery 18 is configured to provide electric power to at least the processing circuit 14, and preferably powers all the electrical components of the monitoring device 10. Also, the connector 20 is coupled with the processing circuit 14 and with the battery 18 and is configured to operatively couple the battery 18 with an external battery charger 22 and to alternatively couple the processing circuit 14 with at least one of a secondary, "external" sensor 24 and a calibration device 26 (FIG. 1), or any other appropriate external device. Thus, the connector 20 is "multifunctional".

Figure 8:
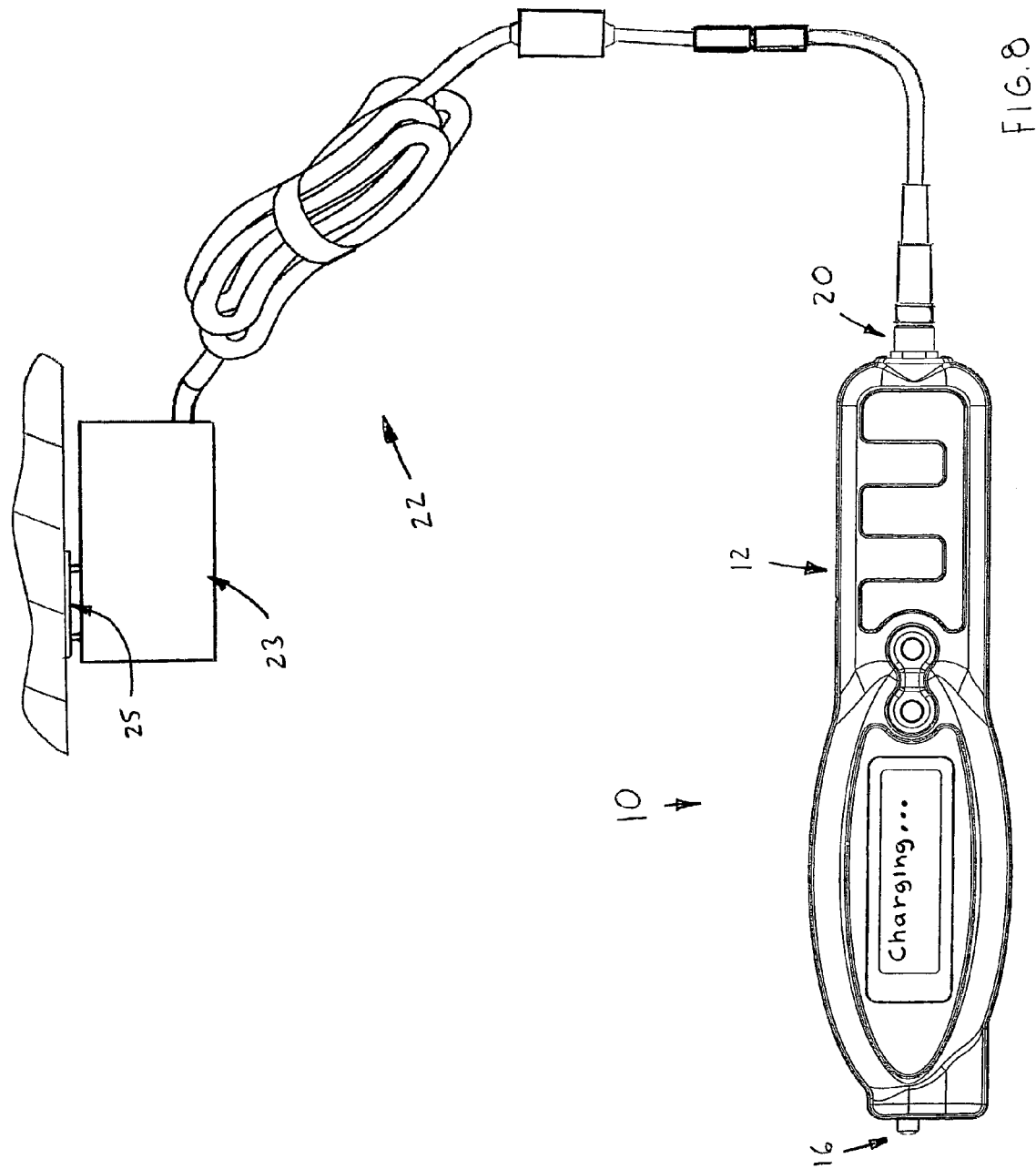
FIG. 8 is a top plan view of the monitoring device, showing the connector coupled with an external battery charger.

More specifically, the connector 20 is configured to transmit electrical energy from the battery charger 22 to the battery 18 when the charger 22 is coupled with the connector 20. Further, the connector 20 is configured to alternatively transmit input $I_P$ from at least one of the secondary sensor 24 and the calibration device 26 and to the processing circuit 14 when the secondary sensor 24 or the calibration device 26 is coupled with the connector 20. Preferably, the monitoring device 10 includes an internal battery charger circuit 19 electrically connected with the connector 20 and with the battery 18 and configured to receive electrical energy from the connector 20, i.e., from the external charger 22, and to utilize the energy to recharge the battery 18. In such a case, the external battery charger 22 preferably includes an AC/DC wall adapter 23 configured to engage with a conventional electrical power outlet 25, as depicted in FIG. 8. However, the monitoring device 10 may alternatively be constructed without an internal battery charger, in which case the external battery charger 22 preferably includes appropriate circuitry configured to control recharging of the battery 18.

Preferably, the monitoring device 10 further comprises a display 11 mounted on or to the housing 12 and coupled with the processing circuit 14. The display 11 is configured to display visual information from input received by the processing circuit 14, which most preferably includes information corresponding to vibration of the machine M as sensed by the primary sensor 16 or the secondary sensor 24, as discussed below. However, the monitoring device 10 may be constructed without a display and may alternatively be configured to transmit information from the processing circuit 14 to an external device, such as a memory or/and a separate display (none shown). Further, the processing circuit 14 preferably includes a microprocessor 15 with an analog-digital (A/D) converter and a memory, as depicted in FIG. 1, but may be constructed in any appropriate manner (e.g., as a pure analog circuit, etc.).

Figure 7:
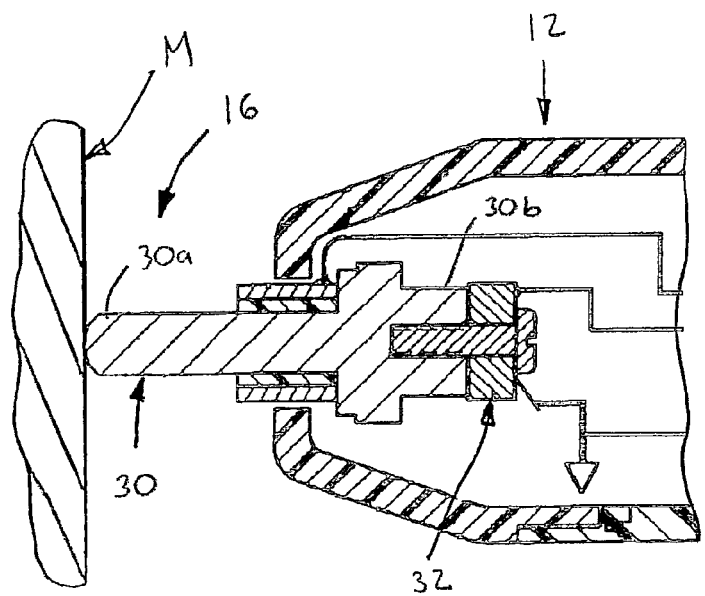
FIG. 7 is a broken-away, cross-sectional view of a front end of the monitoring device taken through line 7-7 of FIG. 6, showing a preferred primary sensor.

Referring to FIGS. 1 and 7, the primary sensor 16 is preferably a contact-type sensor configured to sense vibration, such that the input $I_P$ transmitted from the sensor 16 to the processing circuit 14 corresponds to sensed vibration. Most preferably, the primary sensor 16 includes a probe 30 and a transducer 32 and is constructed generally as disclosed within U.S. Pat. No. 6,006,164, which is incorporated by reference herein. As such, the probe 30 has an outer end 30a disposed externally of the housing 12 and contactable with the machine M, and an inner end 30b disposed within the housing 12. The transducer 32 is disposed within the housing 12 proximal to the probe inner end 30b, is electrically connected with the processing circuit 14, and is contactable by the probe 30. As such, vibrations are transmitted from the probe 30 to the transducer 32, and thereafter sent as input $I_P$ to the processing circuit 14.

Preferably, the primary sensor 16 is configured to sense both overall velocity vibration and enveloped vibration acceleration, as disclosed for example in U.S. Pat. No. 6,006,164. However, the sensor 16 may alternatively be configured to measure displacement or any other single parameter or multiple parameters indicative of vibration in a machine M, and/or may be of a non-contact variety. Furthermore, the primary sensor 16 may be configured to sense or measure any other physical parameter of the machine M, such as for example temperature, noise, etc., and the scope of the present invention encompasses all appropriate types of sensors being utilized as the primary sensor 16.

Figure 4:
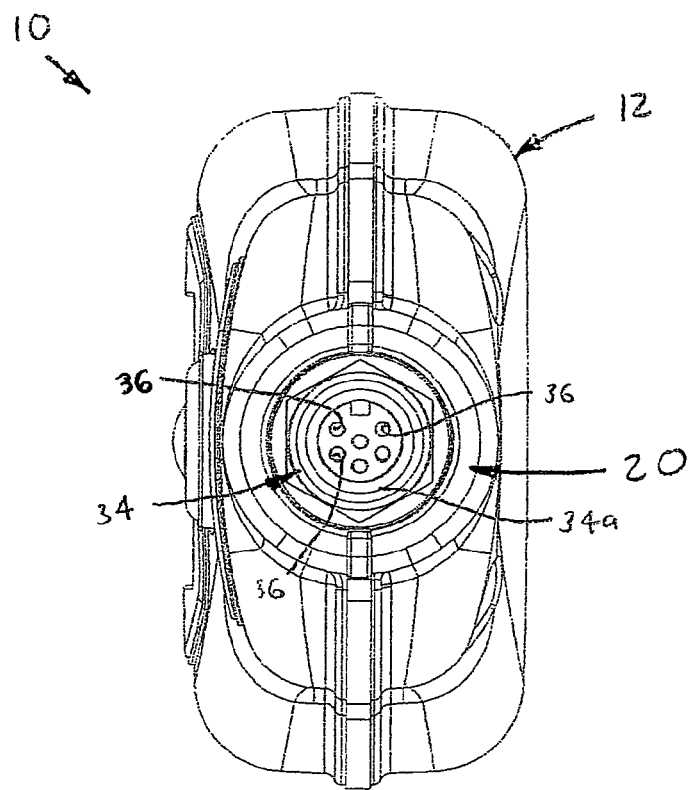
FIG. 4 is an enlarged, rear end view of the monitoring device, showing the connector ports of a connector.
Figure 5:
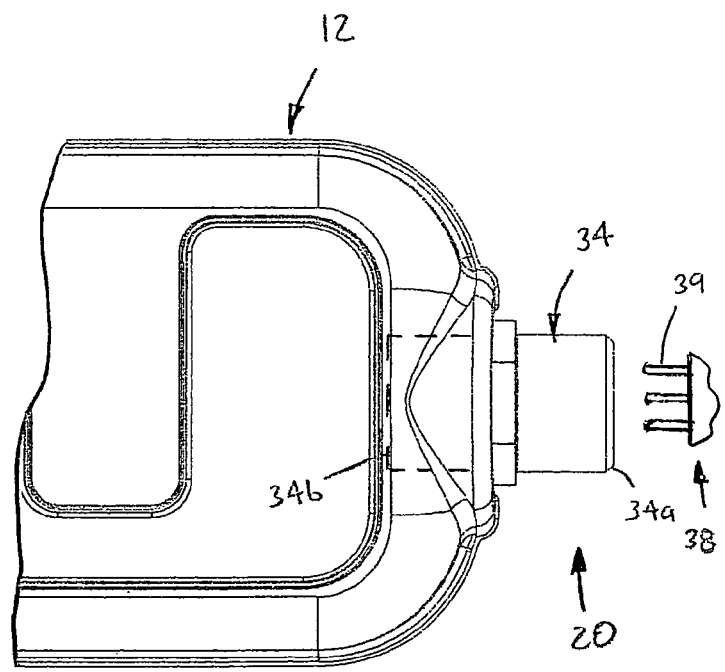
FIG. 5 is an enlarged, broken-away top plan view of a rear end of the monitoring device showing the body of the connector.
Figure 6:
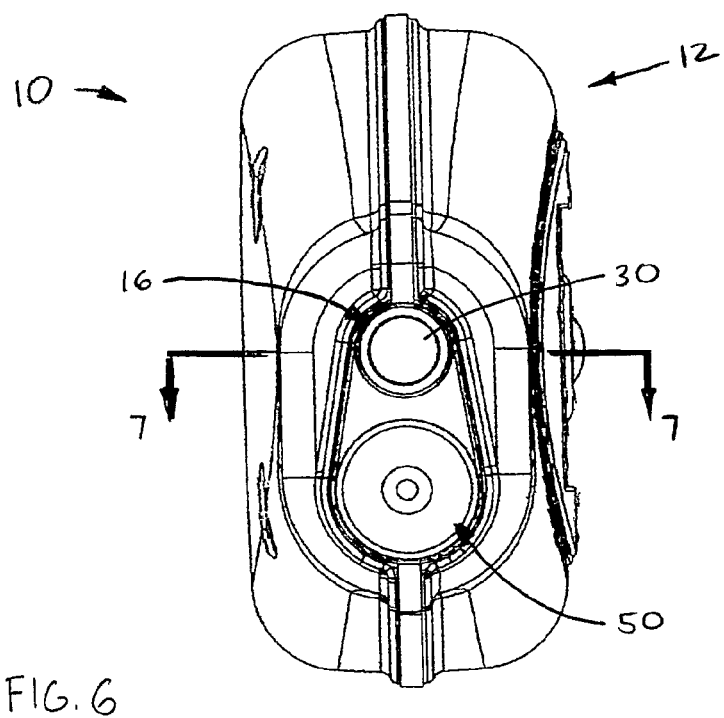
FIG. 6 is an enlarged, front end view of the monitoring device.

Referring to FIGS. 1, 4 and 5, the multifunctional connector 20 preferably includes a generally cylindrical body 34 having an outer end 34a disposed externally of the housing 12 and an inner end 34b disposed internally of the housing 12. The body outer end 34a has an opening 35, preferably generally circular as shown in FIG. 4, that is configured to separately releasably engage with the battery charger 22 and with at least one of, and preferably both of, the secondary sensor 24 and the calibration device 26. Further, the connector body inner end 34b is electrically connected with both of the rechargeable battery 18 and with the processing circuit 14. Most preferably, the connector 20 is directly connected with the internal battery charger 19, and thereby to the battery 18, but may alternatively be directly connected with the battery 18 when the monitoring device 10 is intended for use with a completely external battery charger, as opposed to charger that is primarily a connection with a source of electrical energy (e.g., an AC/DC adapter).

Further, the connector 20 preferably includes at least connector port 36 extending inwardly from the connector body outer end 34a and configured to separately receive a male connector 38 of the battery charger 22 and male connector 38 of at least one of the secondary sensor 24 and the calibration device 26. Preferably, the connector 20 includes a plurality of connector ports or "sockets" 36, specifically six ports 36, each configured to receive a separate one of a plurality of pins 39 of the battery charger 22 and to alternatively receive a separate one of a plurality of pins 39 of at least one of the secondary sensor 24 and the calibration device 26. For example, the connector 20 may be constructed with ports/sockets 36 configured as follows: a first socket for receiving a charge input, a second socket for receiving a charge ground, a third socket for receiving an external sensor, a fourth socket for receiving a sensor ground, a fifth socket for receiving an RXO (receive, serial) pin and a sixth socket for receiving a TXO (transmit, serial) pin.

However, the connector 20 may have any number of ports/sockets 36 or/and may alternatively be constructed with male pins or prongs instead of female sockets. Further, the multifunctional connector 20 may be constructed without either ports/sockets or pins and instead include any other appropriate components for receiving (and preferably transmitting) electronic inputs and/or outputs. The scope of the present invention includes these and any other appropriate structures of the connector 20 that enable the monitoring device 10 of the present invention to function at least generally as described herein.

Referring particularly to FIG. 1, the monitoring device 10 preferably further comprises a "smart" switch 46 disposed within the housing 12 and electrically connected with each of the processing circuit 14, the primary sensor 16 and the connector 20. The switch 46 is adjustable between a first configuration or position at which the processing circuit 14 receives input $I_P$ from the primary sensor 16 and a second configuration/position at which the processing circuit 14 receives input $I_S$ from the connector 20. With such a switch arrangement, the processing circuit 14 is configured to adjust the switch 46 to the second position when the secondary sensor 24 is coupled with the connector 20 and to adjust the switch 46 to the first position when the secondary sensor 24 is uncoupled from the connector 20.

Further, the monitoring device 10 also preferably further comprises a temperature sensor 50 disposed at least partially within the housing 12 and is electrically connected with the processing circuit 14. Preferably, the temperature sensor 50 is a "non-contact" infrared sensor, but may alternatively be any other type of contact or non-contact temperature sensor. In any case, with a temperature sensor 50, the processing circuit 14 is preferably configured to both deactivate the temperature sensor 50 and adjust the smart switch 46 to the second position when the secondary sensor 24 is coupled with the connector 20, and to alternatively reactivate the temperature sensor 50 when the secondary sensor 24 is uncoupled from the connector 20. Further, the processing circuit 14 is also preferably configured to receive input from the primary sensor 16 and the temperature sensor 50 at least generally simultaneously, such that the vibration and temperature measurements may be generally simultaneously taken and displayed to a user of the device 10.

Figure 9:
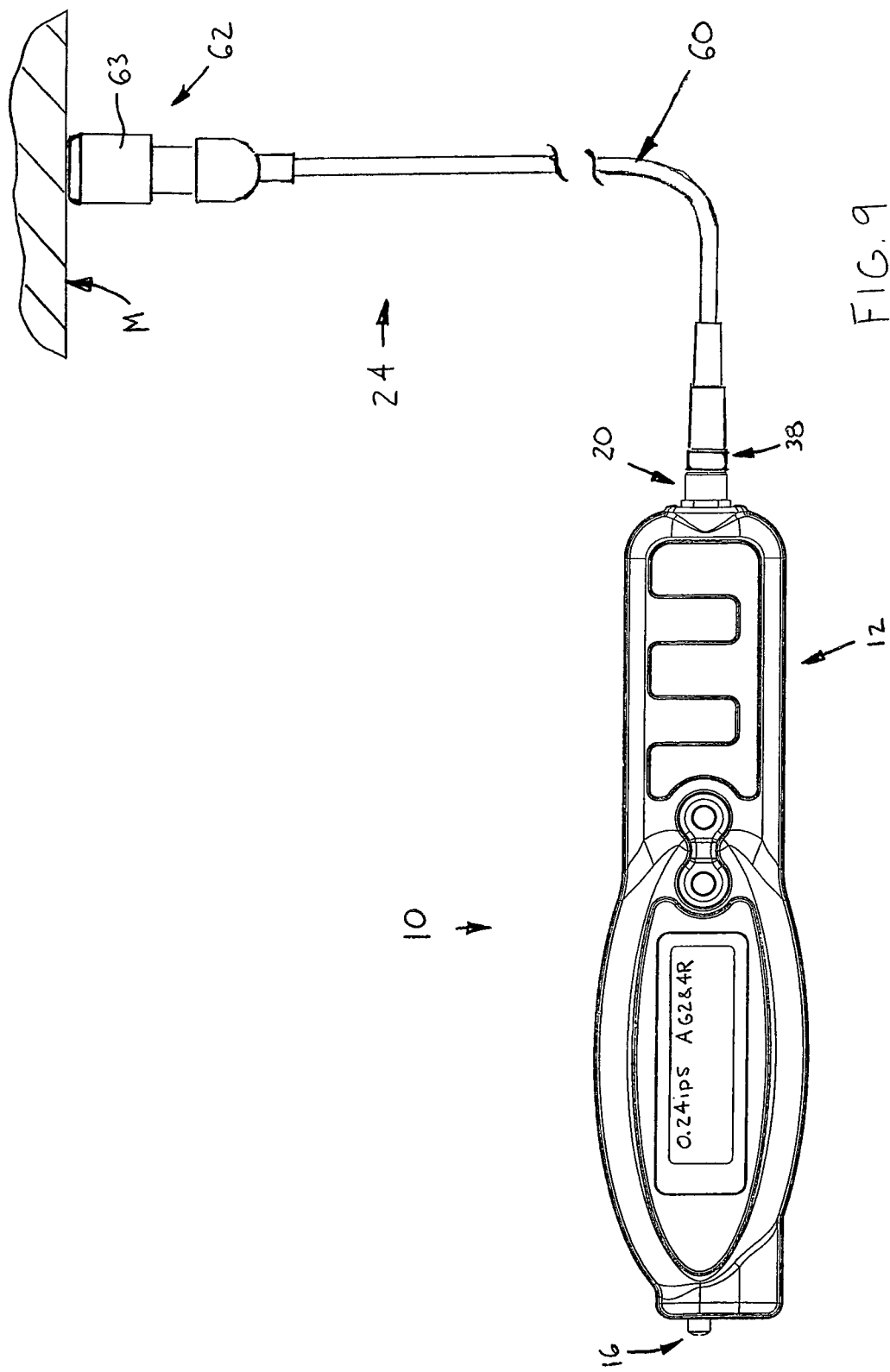
FIG. 9 is yet another top plan view of the monitoring device, showing the connector coupled with an external, secondary sensor.

Referring to FIGS. 1 and 9, the secondary or external sensor 24 preferably includes a cable 60 and a measuring unit 62 configured to be disposable within confined or limited spaces. Thus, the secondary sensor 24 is preferably used for taking measurements of machine parameters in "hard-to-reach" locations on the machine M. Such locations include areas where the housing 12 and/or primary sensor 16 are incapable of being located or for safety reasons, such as high temperature or proximity to rotating or reciprocating machine elements/components. Preferably, the measuring unit 62 is configured to be magnetically mounted to the machine, such as by having one or more magnets 63 (one shown) so as to increase the repeatability and accuracy of the measurements taken by the unit 62.

Further, the external measuring unit 62 is preferably configured to measure vibration, i.e., the input $I_S$ received through the connector 20 is a vibration measurement or signal, and most preferably includes an accelerometer. However, the external measuring unit 62 may alternatively be any other appropriate type of sensor (e.g., temperature, pressure, etc). Also, the cable 60 may either be integrally connected with the measuring unit 62 or may be releasably connectable with the unit 62. When the cable 60 is releasably connectable with the external measuring unit 62, the external measuring unit 62 may be permanently or semi-permanently mounted to the machine M. Further, the cable 60 preferably includes a male connector 38 that includes pins 39 (see FIG. 5), as generally described above, which are constructed or arranged such that the processing circuit 14 is capable of detecting when the external sensor 24 is coupled with the connector 20. As such, when the processing circuit 14 detects the external sensor 24, the circuit 14 adjusts the smart switch 46 to the second position so as to deactivate the primary sensor 16 and the temperature sensor 50 as described above.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally disclosed in the appended claims.

We claim:

1. A portable monitoring device comprising:
    a housing;
    a processing circuit disposed within the housing;
    a primary sensor extending outwardly from the housing, coupled with the processing circuit, and configured to transmit input to the processing circuit;
    a rechargeable battery disposed within the housing and configured to provide electric power to at least the processing circuit; and
    a connector coupled with the processing circuit, the connector being configured to operatively couple the battery with a battery charger and to alternatively couple the processing circuit with at least one of a secondary sensor and a calibration device, the connector having an opening configured to receive the battery charger and to separately and alternatively receive the at least one of the secondary sensor and the calibration device.

2. The monitoring device as recited in claim 1 wherein the connector is configured to transmit electrical energy from the battery charger to the battery when the charger is coupled with the connector and to alternatively transmit input from at least one of the secondary sensor and the calibration device to the processing circuit when the at least one of the secondary sensor and the calibration device is coupled with the connector.

3. The monitoring device as recited in claim 1 wherein the primary sensor is configured to sense vibration such that the input transmitted from the sensor to the processing circuit corresponds to sensed vibration.

4. The monitoring device as recited in claim 1 wherein the connector includes a body having an inner end disposed within the housing and an outer end disposed externally of the housing, the outer end being configured to separately releasably engage with the battery charger and with at least one of the secondary sensor and the calibration device.

5. The monitoring device as recited in claim 4 wherein the connector further includes a connector port extending inwardly from the outer end and configured to separately receive a male connector of the battery charger and at least one of the secondary sensor and the calibration device.

6. The monitoring device as recited in claim 5 wherein the connector includes a plurality of connector ports each configured to receive a separate one of a plurality of pins of the battery charger and a separate one of a plurality of pins of at least one of the secondary sensor and the calibration device.

7. The monitoring device as recited in claim 4 wherein the connector body is generally cylindrical and has an outer surface, the outer surface having at least one exterior thread engageable with an interior thread of at least one of the battery charger, the secondary sensor and the calibration device.

8. The monitoring device as recited in claim 4 wherein the connector body inner end is electrically connected with the battery charger and with the processing circuit.

9. The monitoring device as recited in claim 1 further comprising a temperature sensor disposed at least partially within the housing and wherein the primary sensor is a vibration sensor.

10. The monitoring device as recited in claim 9 further comprising a switch disposed within the housing, electrically connected with each of the processing circuit, the connector and the primary sensor, the switch being adjustable between a first position at which the processing circuit receives input from the primary sensor and a second position at which the processing circuit receives input from the connector, the processing circuit being configured to deactivate the temperature sensor and adjust the switch to the second position when the secondary sensor is coupled with the connector.

11. The monitoring device as recited in claim 10 wherein the processing circuit is further configured to adjust the switch to the first position when the secondary sensor is uncoupled from the connector.

12. The monitoring device as recited in claim 1 further comprising a switch disposed within the housing, electrically connected with each of the processing circuit, the connector and the primary sensor, the switch being adjustable between a first position at which the processing circuit receives input from the primary sensor and a second position at which the processing circuit receives input from the connector, the processing circuit being configured to adjust the switch to the second position when the secondary sensor is coupled with the connector and to adjust the switch to the first position when the secondary sensor is uncoupled from the connector.

13. The monitoring device as recited in claim 1 wherein the housing is sized to be manually grasped by a user.

14. The monitoring device as recited in claim 1 wherein the primary sensor includes a probe, the probe having an outer end disposed externally of the housing and an inner end disposed within the housing, and a transducer disposed within the housing proximal to the inner end, electrically connected with the processing circuit and contactable by the probe such that vibrations are transmitted from the probe to the transducer.

15. A portable monitoring device comprising:
a housing;
a processing circuit disposed within the housing;
a primary sensor extending outwardly from the housing, coupled with the processing circuit, and configured to transmit input to the processing circuit;
a temperature sensor disposed proximal to the primary sensor and configured to transmit temperature input to the processing circuit;
a connector coupled with the processing circuit and configured to operatively couple the processing circuit with a secondary sensor; and
a switch disposed within the housing, electrically connected with each of the processing circuit, the connector and the primary sensor, the switch being adjustable between a first position at which the processing circuit receives input from the primary sensor and a second position at which the processing circuit receives input from the connector, the processing circuit being configured to deactivate the temperature sensor and adjust the switch to the second position when the secondary sensor is coupled with the connector.

16. The monitoring device as recited in claim 15 wherein the processing circuit is further configured to adjust the switch to the first position when the secondary sensor is uncoupled from the connector.

17. The monitoring device as recited in claim 15 further comprising a rechargeable battery disposed within the housing and configured to provide electric power to at least the processing circuit, wherein the connector is further configured to alternatively couple the battery with a battery charger.

18. The monitoring device as recited in claim 15 wherein the primary sensor is configured to sense vibration such that the input transmitted from the sensor to the processing circuit corresponds to sensed vibration.

19. The monitoring device as recited in claim 15 wherein the housing is sized to be manually grasped by a user.

20. The monitoring device as recited in claim 15 wherein the primary sensor includes a probe, the probe having an outer end disposed externally of the housing and an inner end disposed within the housing, and a transducer disposed within the housing proximal to the inner end, electrically connected with the processing circuit and contactable by the probe such that vibrations are transmitted from the probe to the transducer.

21. A portable monitoring device comprising:
a housing;
a processing circuit disposed within the housing;
a primary sensor extending outwardly from the housing, coupled with the processing circuit, and configured to transmit input to the processing circuit;
a rechargeable battery disposed within the housing and configured to provide electric power to at least the processing circuit; and
a connector coupled with the processing circuit, the connector being configured to operatively couple the battery with a battery charger and to alternatively couple the processing circuit with at least one of a secondary sensor and a calibration device;
wherein the connector includes a body having an inner end disposed within the housing and an outer end disposed externally of the housing, the body outer end having an opening configured to separately releasably engage with the battery charger and with at least one of the secondary sensor and the calibration device.

* * * * *